United States Patent [19]

Nuttall

[11] 3,935,343

[45] Jan. 27, 1976

[54] MOLTEN SALT METHOD OF PRODUCING FIRE RESISTANT WOOD ARTICLES

[75] Inventor: Harold W. Nuttall, Long Grove, Ill.

[73] Assignee: United States Gypsum Company, Chicago, Ill.

[22] Filed: Feb. 21, 1974

[21] Appl. No.: 445,372

Related U.S. Application Data

[63] Continuation of Ser. No. 224,597, Feb. 7, 1972, abandoned.

[52] U.S. Cl. ............... 427/353; 427/369; 427/397; 427/431; 427/440; 428/921; 21/7
[51] Int. Cl.² ................ B44D 1/14; C09K 3/28
[58] Field of Search ......... 21/7; 117/65.2, 116, 138, 117/147, 136; 427/370, 353, 369, 397, 431, 440; 428/921

[56] References Cited

UNITED STATES PATENTS

| | | | |
|---|---|---|---|
| 2,766,139 | 10/1956 | Green et al. | 117/138 |
| 2,994,620 | 8/1961 | Franck et al. | 117/147 X |
| 3,501,339 | 3/1970 | Gurgiolo | 117/147 X |
| 3,624,233 | 11/1971 | Goulet | 117/147 X |
| 3,671,299 | 6/1972 | Barnett | 117/147 X |
| 3,677,805 | 7/1972 | Barnett | 117/147 X |
| 3,682,675 | 8/1972 | Myers | 117/138 X |

*Primary Examiner*—Michael R. Lusignan
*Attorney, Agent, or Firm*—Samuel Kurlandsky, Esq.; Stanton T. Hadley, Esq.; Kenneth E. Roberts, Esq.

[57] ABSTRACT

Hardboard and other wood articles are made fire resistant by immersing the wood in a molten ammonium phosphate salt bath, preferably monoammonium phosphate.

16 Claims, No Drawings

MOLTEN SALT METHOD OF PRODUCING FIRE RESISTANT WOOD ARTICLES

This is a continuation of application Ser. No. 224,597, filed Feb. 7, 1972, now abandoned.

BACKGROUND OF THE INVENTION

The present invention relates to producing wood and wood fiber products, such as plywood or hardboard, having improved resistance to fire; and more particularly to a novel method of impregnating wood articles with fire resistant ammonium phosphates.

The building industry has long recognized that the production of wood and wood fiber products such as hardboard and plywood that are rendered fire resistant broadens their field of use. Many proposals have been made to incorporate various fireproofing agents in such products. For example, materials such as borax, phosphates, and similar agents have been added both during production of wood products and by impregnation of the finished product. The prior art methods, however, are not completely satisfactory.

Addition during the production of hardboard occurs prior to the conventional pressing operation; and causes problems in pressing due to the premature decomposition of the fire retardant materials at press temperatures or to interference with the fiber-to-fiber, or lignin, bond. Further it is difficult to obtain sufficient retention of the added agents to impart any great degree of fire resistance to the product.

Methods of impregnating the finished product also raise problems. Solvent solutions of the treating agent may be used, but give rise to problems of solvent flammability and other problems involved in the use of hazardous chemicals. Post-manufacture impregnation with water soluble salts, such as the monoammonium or diammonium phosphates, pose quite a problem in maintaining the smooth pressed surface of the board, since water and aqueous solutions tend to raise and roughen wood fiber surfaces as discussed in U.S. Pat. Nos. 3,318,725 and 3,505,102. The use of aqueous solutions further requires a drying cycle to remove water absorbed into the wood fibers during treatment. This necessitates expensive equipment, and is time consuming. For example Green et al U.S. Pat. No. 2,766,139 calls for a drying or baking time in a forced air oven of 12–16 hours. If a drying cycle takes too long, the process is uneconomical. Further, if a drying cycle is too fast, then the salt tends to migrate to the surface of the board, with the consequent formation of bubbles or blisters of crystallized salt on the board's surface. Also when aqueous solutions are used, the board tends to swell in thickness.

It is also known to give other treatments to wood which do not relate to imparting fire resistance, such as Kobbe U.S. Pat. No. 1,599,135 discloses immersing wood into molten sulfur in an open tank to render the wood resistant to rot. There is no suggestion that any fire resistance may be imparted thereby; and the surface of the wood is either charred to charcoal or, to avoid charring, the wood must be immersed at a lower temperature for the first five or six hours.

Stamm U.S. Pat. No. 2,296,316 discloses treating wood to prevent shrinkage by heating the wood at temperatures between 500°–600°F and eliminating surface oxidation by immersing the wood in a liquid bath of molten metal; heated oil; or a fused mixture of sodium and potassium acetate. The board is then scrubbed to remove surface metal or fused salt and surface char. The process takes considerable time and there is no suggestion of any possible fire resistance imparted thereby.

Gurgiolo U.S. Pat. No. 3,501,339 mentions in column 2, soaking wood in a phosphite or phosphonate when it is a liquid; but gives no operable embodiments thereof other than as solvent or aqueous solutions.

The above processes either relate to processes of treating wood, but not specifically imparting fire resistance, or suffer various disadvantages such as incorporating insufficient quantities of fire retardant material; involving too lengthy or complex treatment steps and cycles; involving very costly and complex special equipment; or impairing the surface appearance and quality of the wood.

SUMMARY OF THE INVENTION

The present invention comprises a novel method of impregnating wood and wood fiber products with molten ammonium phosphates to render them highly fire resistant, without marring the smooth surface nor substantial charring or depositing of salt crystals on the surface, without swelling the product, and without extensive solvent or forced air drying cycles.

Thus it is an object and advantage of the present invention to produce fire resistant wood and wood fiber products by treating the wood with a molten ammonium phosphate, without marring the smooth wood fiber surface or impart thickness swell.

A further object is to produce fire resistant wood and wood fiber products without requiring extensive process times as to impregnation or drying of the impregnated product.

Still another object is to produce wood and wood fiber products having enhanced degrees of fire resistance, a smooth surface, and improved strength.

DESCRIPTION OF THE INVENTION

In one specific embodiment, the above objects and others are accomplished by immersing hardboard in a molten ammonium phosphate salt such as monoammonium phosphate, diammonium phosphate or mixtures of monoammonium phosphate - diammonium phosphate; under a pressure of at least about 10 p.s.i.g. It is preferred that the molten salt bath be principally monoammonium phosphate. The bath should be maintained at a pH of about 1.5–6, and preferably about 3–5 such as around 3.5, generally by the addition of diammonium phosphate. Impregnation of the board with large quantities of the fire retardant salt is accomplished by a single quick immersion of the board in the molten salt bath; and then subjecting the board to momentary pressure while it is still immersed in the molten salt, to give thorough penetration. After impregnation, the board is quite hot and may be dipped or immersed in water immediately to wash any excess salt from the surface of the board. The water rinse is accomplished in seconds; thus the board is still hot and the surface water dissipates within seconds eliminating the need for any extensive drying cycle or force air drying.

The invention has been developed primarily in connection with the treatment of hardboard; and the hardboard referred to herein includes composition and particle boards of lignocellulosic origin of various densities. The invention, however, is also applicable to the treatment of other wood articles generally, such particularly as solid wooden articles like veneers, boards or panels and the like; wood laminates such as veneered articles and plywoods and other, and at least slightly porous, woody structured articles including composition board and blends of woody fiber with other fibrous materials such as mineral, glass and the like fibers. Optimum conditions of the wood article for impregnation are related to the density of the wood article and also its porosity. Thus for example a low density hardboard will absorb more salt then a higher density hardboard in the same amount of time under the same pressure. For example, a hardboard having a density of about 50 lbs. per cubic foot will absorb approximately 71% ammonium phosphate in 2 minutes, by weight of dry board, using an air pressure of 60 p.s.i.g., compared to about 31% absorption for a hardboard having a density of 60 lbs./ft.$^3$ using the same time and pressure.

The ammonium phosphate may be put into the molten state by, for example, heating the crystal form until it melts. Generally monoammonium phosphate becomes molten around 400°F; but there is a gradual breakdown of the chemical when maintained at this temperature over a period of time, and this lowers the temperature at which the mixture of monoammonium phosphate and its degredation products will remain in molten condition. Thus, for example, monoammonium phosphate may initially become molten at about 380°–400°F; however when the molten phosphate is cooled and then remelted, it may then melt at a lower temperature. Thus, the temperature of the ammonium phosphate, in order to maintain it in the molten state, is not critical and may be highly variable depending upon the prior history of the ammonium phosphate used in the present process.

The pH of the molten ammonium phosphates will be on the acid side. It is particularly preferred that the pH of the molten phosphate be maintained between about 1.5–6; and it is especially preferred that a pH of about 3.5 be maintained. A lower pH limit has not been established, although it is theorized that wood products such as hardboard may become more brittle and may break down after very long aging at pHs somewhat below 2. While a pH substantially above about 4 may be utilized, this is not particularly desirable since at the higher pHs the ammonium phosphates crystallize at higher temperatures, necessitating the utilization of higher temperatures to maintain the ammonium phosphate in molten condition. The level of the pH may be readily maintained by preferably the addition of diammonium phosphate to molten momoammonium phosphate; or by addition of gaseous ammonia, and the like.

In actual practice, for carrying out the present invention over long periods of time, it is particularly preferred that the bath be monoammonium phosphate and that DAP be added thereto to make pH adjustments. Either the mono- or the diammonium phosphate may be used as the sole fire retardant material.

The pressure applied to the immersed wood article is not critical and may be widely varied. A pressure range of 10–100 p.s.i.g. is preferred, and 60–80 p.s.i.g. is particularly preferred. The pressure should be at least 10 p.s.i.g. but the upper limit is a matter of personal preference and may be 200 or 300 p.s.i.g. or even more.

In order to more fully describe the present method the following illustrative specific examples, including comparisons with a prior aqueous solution method, are provided.

EXAMPLE 1

Lignocellulosic fiber hardboards, ¼ inch thick and 2 foot by 4 foot, were pressure impregnated with a 60% concentrated aqueous solution of a blend of monoammonium phosphate and diammonium phosphate at 200°F and 60–80 p.s.i.g. for 2–3 minutes. Because of the large quantities of water from the aqueous solution absorbed into the boards during impregnation, the boards had to be oven dried for 2–4 hours to reduce the moisture content of the boards to 3% or less.

Monoammonium phosphate crystals were placed in glass beakers and melted at about 425°–450°F. The molten monoammonium phosphate was then pressure impregnated using a glass lined container at 400°–440°F and 60–80 p.s.i.g. pressure into hardboards, one-fourth inch and about 1 foot × 1 foot, for 2–3 minutes. After impregnation the boards were washed by dipping into water to rinse excess salt from the surface. Upon removal, surface water dissipated from the about 400°F boards within seconds, and the impregnated boards at that time contained less than 3% moisture. No further drying was necessary. The elimination of the drying cycle as compared to the aqueous solution method according to this example results in increases in production rate of about 1000%. Thus it is clear the present invention provides a method greatly simplified over those previously known, both in reduction in the number of operations, expensive drying equipment required, and in the time required to carry out the steps. The finished boards by the method of the present invention exhibited little or no thickness swell and the surfaces of the boards were smooth and free from crystallized salt.

EXAMPLE 2

The procedure of Example 1 for the molten monoammonium phosphate was repeated using ¼ inch thick plywood panels instead of the hardboard. Results were comparable. The impregnated plywood had a fire rating of Class 1 by Heylin Tunnel testing.

EXAMPLE 3

A series of smooth on both sides hardboard panels were impregnated with ammonium phosphate salts using the following treatment methods:

Method 1: An aqueous solution of 65% concentration of mono- and diammonium phosphates (weight ratio mono-: di- of 3:1) at 200°F and 60 p.s.i.g. for 2 minutes. The treated boards were bone dried (at least less than 1% moisture content) in an oven to remove all moisture gained during treatment in order to calculate the amount of phosphates absorbed.

Method 2: In accordance with the method of the present invention, the boards were impregnated with molten monoammonium phosphate at about 400°F using a pressure cycle of 80 p.s.i.g. for 2 minutes in Teflon, ceramic or epoxy lined containers. After impregnation the boards were dipped in hot water of 180°F. They were then bone dried to determine the amount of salt absorbed.

All boards were also evaluated for physical characteristics including fire resistance. Fire resistancy was determined using a Heylin tunnel, a system widely used in the industry, as fully described in an article entitled "Use of a Small Flame Tunnel for Evaluating Fire Hazard" in the Journal of Paint Technology, vol. 39, No.

511, August 1967, pp. 494-500. The results of testing with the Heylin Tunnel, as explained in the article, may be correlated with the results obtained by ASTM Method E-84; a Heylin result of 22 or less being generally required to equal the 25 or less result of ASTM E-84, requisite to an Underwriters laboratories Class 1 fire rating.

Exemplary results were as set forth in Table 1.

TABLE 1

|  | Method 1 | Method 2 | Untreated Control |
|---|---|---|---|
| Initial Board Density — lbs./ft.$^3$ | 48.5 | 48.9 | 48.8 |
| Treated Board Density after drying | 61.8 | 79.2 | — |
| % Calculated thickness Change: Untreated to Treated | +5.4 | −0.7 | |
| % Ammonium Phosphates Absorbed | 40.1 | 67.5 | — |
| Flame Spread —Heylin Tunnel | 14.3 | 11.9 | 159.6 |
| Modulus of Rupture —p.s.i. | 6,281 | 10,392 | 3,882 |
| Internal Bond —p.s.i. | 222 | 484 | 91 |
| Impact Strength inch-pounds | 19.0 | 24.2 | 21.5 |

During impregnation by the aqueous method, both water and salt are absorbed. In the molten method of the present invention only salt is absorbed, and so a board of the same or similar density and porosity will absorb more salt, as shown in Table 1. The lower flame spread rating in Table 1 for Method 2 is a result of the greater amount of chemical absorbed during treatment. The molten salt treatment (Method 2) surprisingly improved the strength characteristics of the hardboard — modulus of rupture, internal bond strength and impact strength were all greatly improved, possibly due to the higher density of the treated board. The improved impact strength is very surprising since this property is normally adversely affected by fire retardant chemical treatments, as indicated in the results with Method 1. The high density and negative thickness swell of the boards under Method 2 is characteristic of the molten salt treatment of the present invention; the boards may be considered in a swollen condition prior to treatment due to the initial moisture content of the boards (generally from 2–10%). The temperature of the boards following immersion in the molten ammonium phosphates is such as to dissipate initial board moisture and any moisture picked up from the water rinse. The board surface is essentially unchanged, as to smoothness, appearance and receptivity to subsequent finishing operations by treatment in accordance with the present invention.

EXAMPLE 4

The pH of crystalline monoammonium phosphate dissolved in deionized water is about 4.4. However the pH of molten monoammonium phosphate drops considerably as it is held for periods of time in the molten state. It is particularly preferred that the pH be maintained around 3.5 to avoid possible detrimental effects on the treated hardboard and excessive corrosion of equipment. This pH can readily be maintained by additions of crystalline diammonium phosphate to the molten monoammonium phosphate. Table 2 illustrates control of molten monoammonium phosphate pH useable in the present method by various additions of diammonium phosphate. In all instances the starting phosphate materials were placed into glass beakers and heated at 425°F until the chemicals became molten. A temperature of 425°F was then maintained throughout. At 1 hour periods, pH readings were made. In the series where diammonium phosphate was added, the additions were made every hour, just after the pH reading was taken. Representative results are set forth in Table 2.

TABLE 2

| Time at 400°F+ | pH of MAP* Control | Amount of DAP** Added | pH of MAP* with added DAP** |
|---|---|---|---|
| 1 hour | 3.28 | 9.0% | 3.60 |
| 2 hours | 2.60 | 8.3 | 4.00 |
| 3 hours | 2.40 | 7.7 | 4.61 |
| 4 hours | 2.21 | 7.0 | 5.10 |
| 5 hours | 2.08 | 6.7 | 5.20 |
| 6 hours | 2.01 | 6.3 | 5.35 |
| 21 hours | 2.00 | none*** | 5.40 |
| 22 hours | 1.80 | 6.0 | 2.50 |
| 23 hours | 1.80 | 5.5 | 2.91 |

*Monoammonium phosphate
**Diammonium phosphate
***left overnight at 425°F with no addition of DAP.

While the present invention has been described and exemplified with respect to certain embodiments, it is not to be considered limited thereto; and it is understood that variations and modifications thereto, obvious to those skilled in the art, may be made without departing from the spirit or scope of this invention.

What is claimed is:

1. A method for imparting fire resistance to wood articles within a period of 3 minutes which comprises immersing the wood article in molten ammonium phosphate substantially free of water under a pressure of at least about 10 p.s.i.g.

2. The method of claim 1 in which the ammonium phosphate is selected from the group consisting of monoammonium phosphate, diammonium phosphate and mixtures thereof.

3. The method of claim 1 in which the molten phosphate is maintained at a pH of about 1.5–6.

4. The method of claim 1 in which the molten phosphate is monoammonium phosphate; and the molten phosphate is maintained at a pH of about 1.5–6 by the addition of diammonium phosphate.

5. The method of claim 3 in which the pH is about 3–4.

6. The method of claim 1 in which the pressure is about 10–100 p.s.i.g.

7. The method of claim 1 including the steps of removing the wood article from the molten salt and washing the surface with water.

8. A method for imparting fire resistance to hardboard within a period of three minutes which comprises immersing the hardboard in a molten ammonium phosphate salt bath substantially free of water; subjecting the immersed hardboard to a pressure of at least 10 p.s.i.g.; removing the hardboard from the molten salt bath; and washing the treated hardboard with water.

9. The method of claim 8 in which the treated hardboard is dipped in water and then allowed to air dry.

10. The method of claim 8 in which the molten salt is selected from the group consisting of monoammonium phosphate, diammonium phosphate and mixtures thereof.

11. The method of claim 8 in which the pH is about 1.5–6.

12. The method of claim 11 in which the pH is about 3.5.

13. The method of claim 8 in which the pressure is about 10–100 p.s.i.g.

14. The method of claim 8 in which the pressure is about 60–80 p.s.i.g.

15. The method of claim 1, wherein the initial temperature of said molten ammonium phosphate is in the range of about 380°–400° F.

16. The method of claim 8, wherein the initial temperature of said molten ammonium phosphate salt is in the range of about 380°–400° F.

* * * * *